(12) United States Patent
Russell et al.

(10) Patent No.: US 7,898,408 B2
(45) Date of Patent: Mar. 1, 2011

(54) VOICE-AIDED UNATTENDED SURVEILLANCE SENSOR DEPLOYMENT SYSTEM AND ASSOCIATED METHODS

(75) Inventors: Michael J. Russell, Rochester, NY (US); David C. Swan, Webster, NY (US); Paul Voglewede, N. Chili, NY (US); Robert A. Johnson, Pittsford, NY (US)

(73) Assignee: Harris Corporation, Melbourne, FL (US)

( * ) Notice: Subject to any disclaimer, the term of this patent is extended or adjusted under 35 U.S.C. 154(b) by 349 days.

(21) Appl. No.: 12/265,077

(22) Filed: Nov. 5, 2008

(65) Prior Publication Data

US 2010/0109863 A1 May 6, 2010

(51) Int. Cl.
*G08B 1/08* (2006.01)
*G08B 1/00* (2006.01)
*H04M 1/725* (2006.01)

(52) U.S. Cl. ............. 340/539.11; 340/531; 340/539.17; 340/539.18; 340/539.21; 455/412.2

(58) Field of Classification Search ............. 340/539.11
See application file for complete search history.

(56) References Cited

U.S. PATENT DOCUMENTS

| | | | |
|---|---|---|---|
| 6,400,265 B1 * | 6/2002 | Saylor et al. ................. | 340/531 |
| 6,980,106 B2 | 12/2005 | Sutphin .................. | 340/539.26 |
| 7,009,510 B1 * | 3/2006 | Douglass et al. ............ | 340/531 |
| 2003/0076226 A1 | 4/2003 | Roberts ....................... | 340/539 |
| 2008/0111884 A1 | 5/2008 | Cloutier et al. ............. | 348/152 |
| 2008/0111885 A1 | 5/2008 | Voglewede et al. .......... | 348/152 |
| 2008/0114914 A1 | 5/2008 | Cloutier et al. ............. | 710/110 |

* cited by examiner

*Primary Examiner*—Donnie L Crosland
(74) *Attorney, Agent, or Firm*—Allen, Dyer, Doppelt, Milbrath & Gilchrist, P.A.

(57) ABSTRACT

The surveillance system includes a remote monitoring station, at least one mobile radio (e.g. a handheld radio), and one or more deployable sensors each for unattended surveillance to transmit a detection signal in response to a detected activity. A deployable gateway surveillance node includes a controller and at least one wireless transceiver cooperating therewith to transmit a notification to the remote monitoring station based upon a received detection signal, and determine and transmit a voice-message status report, based upon the received detection signal, to the at least one mobile radio identifying the deployable gateway surveillance node and corresponding deployable sensor for the received detection signal. The voice message status report may further include information regarding a status of a communication link between the deployable gateway surveillance node and the remote monitoring station, a received detection signal strength, detected activity information and/or a status of a positioning information communication link between the deployable gateway surveillance node and a positioning/ navigation system.

21 Claims, 3 Drawing Sheets

VOICE-AIDED UNATTENDED SURVEILLANCE SENSOR DEPLOYMENT SYSTEM AND ASSOCIATED METHODS

FIELD OF THE INVENTION

The present invention relates to the field of sensors, and, more particularly, to remote and unattended ground sensor systems and related methods.

BACKGROUND OF THE INVENTION

Remote, unattended intrusion detection and surveillance capabilities are suited to the security of installations (commercial, government and/or military) and perimeters, as well as for the protection of borders and other assets (e.g. associated with homeland defense). For example, Harris Corporation of Melbourne, Fla., and Assignee of the present application, produces an advanced sensor system product line that offers such features: the Harris Falcon Watch® Remote Intrusion Detection and Surveillance system.

The Falcon Watch® system includes the RF-5405 Intelligent Gateway, a communications node that receives alarms from multiple sensors and fuses the data into actionable reports for relay to command centers. The Falcon Watch® system utilizes seismic detectors, which detect and classify ground vibration caused by vehicles or pedestrians; magnetic detectors, which detect the movement of metal objects such as weapons or vehicles, and passive infrared (PIR) sensors, which detect the movement of thermal signatures such as vehicles or pedestrians. Input is processed at the point of detection and then the resulting alarms are transmitted by radio to a monitoring point.

Multiple radio relay nodes can be used to extend the system to protect larger-scale perimeters. The Falcon Watch system is modular and configurable to address a broad range of threat or topographical environments. The system is specifically designed to withstand the rigors of harsh environments while operating in remote locations for extended periods without battery replacement. The Falcon Watch® system detects the movement of vehicles and people while filtering out non-threatening, naturally occurring events. It transmits alarms to the Harris Falcon® II RF-5800V-HH Advanced VHF Tactical Handheld Radio or the Falcon° II RF-5800M-HH Advanced Multiband Tactical Handheld Radio in addition to the central monitoring point.

This allows the user to receive real-time sensor alerts directly without carrying additional monitoring hardware. The sensor alarms can also be displayed at the central monitoring point by the Harris RF-6910 Situational Awareness System to provide a complete operational picture at a command center. The Falcon Watch® Sensor system is available in various configurations. The Force Protection configuration is ideal for tactical, on-the-move missions, and for temporary set-ups and deployments. It is small, lightweight, easy to use, and features extended operational life as a result of its advanced low-power techniques. Tactical radio integration results in less equipment that the operator is required to carry and provides immediate notification of area intrusions. The Perimeter Surveillance configuration of the Falcon Watch® Sensor system is designed for applications requiring more complex detection and surveillance such as fixed installations and power-generation facilities.

U.S. Patent Application Publication No. 2008/0111884 to Cloutier et al. (and assigned to Harris Corporation) is directed to an unattended sensor for use in a surveillance system. The sensor includes a detector, a signal processor, a radio transceiver, a power source, and a controller which configures the sensor in either a sensor mode or a relay mode. The monitoring device may be a handheld radio device equipped with a transceiver for sending and receiving data and able to receive event messages from sensor nodes residing in the network. In addition, the radio device may include a signal processor adapted to receive the event messages and provide indicia of the event to the radio operator, e.g. an audible indicator or visual indicator on a display.

Specialized equipment with a large, bright displays (such as a laptop computer or PDA) interfaced with a central gateway node to display status indications and event messages from sensor nodes, may result in added weight and bulk. Such a design may also compromise covertness and/or be impractical for one person to deploy.

SUMMARY OF THE INVENTION

In view of the foregoing background, it is therefore an object of the present invention to provide a surveillance system, devices and associated methods that reduce the labor needed, increase simplicity and maintain covertness during system deployment.

This and other objects, features, and advantages in accordance with the present invention are provided by a surveillance system including a remote monitoring station, at least one mobile radio (e.g. a handheld radio), and one or more deployable sensors each for unattended surveillance to wirelessly transmit a detection signal in response to a detected activity. A deployable gateway surveillance node collects information from the sensors and includes a controller and at least one wireless transceiver cooperating therewith to receive detection signals, transmit a notification to the remote monitoring station based upon a received detection signal, and determine and transmit a voice-message status report, based upon the received detection signal, to the at least one mobile radio identifying the deployable gateway surveillance node and corresponding deployable sensor for the received detection signal.

Thus, the present approach includes a voice-message transmission capability for use during deployment of the surveillance gateway and associated sensors. Received detection signals during deployment cause the surveillance gateway to transmit the voice-message reports to communication equipment such as a handheld radio. The reports include such information as identification of the corresponding sensor and surveillance gateway, status of the sensor and/or health of the surveillance gateway. The transmission of voice reports in this manner may remain active during the deployment period, after which time the system may automatically switch to a primary mode of event data transmission. Accordingly, the system may be deployed with a single operator and without the need for specialized equipment.

The voice-message status report may further include information regarding a status of a communication link between the deployable gateway surveillance node and the remote monitoring station, a received detection signal strength and/or detected activity information. The controller and the receiver in the deployable gateway surveillance node may also cooperate to establish a positioning information communication link with a positioning/navigation system, such as a GPS satellite. The voice-message status report may include information regarding a status of the positioning information communication link between the deployable gateway surveillance node and the positioning/navigation system.

The controller and the wireless transceiver of the deployable gateway surveillance node may transmit the voice-message status report to the mobile radio during a system deployment mode and for a predetermined time period after the deployable gateway surveillance node receives the detection signal during the system deployment mode. The deployable sensor may include at least one detector and associated wireless transmitter to generate and transmit the detection signal in response to the detected activity. The detector may include a passive infrared (PIR) detector, a seismic detector, a magnetic detector and/or an acoustic detector, for example. A plurality of deployable sensors may be used for unattended surveillance. Also, at least one deployable relay node may be provided to relay detection signals to the deployable gateway surveillance node.

A method aspect is directed to deploying a surveillance system including a remote monitoring station, at least one mobile radio, at least one deployable sensor and a deployable gateway surveillance node having a controller and at least one wireless transceiver cooperating therewith. The method includes positioning the deployable gateway surveillance node, and positioning the at least one deployable sensor for unattended surveillance to wirelessly transmit a detection signal in response to a detected activity. The method further includes transmitting a notification from the deployable gateway surveillance node to the remote monitoring station based upon a received detection signal, and determining and transmitting a voice-message status report, based upon the received detection signal, from the deployable gateway surveillance node to the at least one mobile radio identifying the deployable gateway surveillance node and corresponding deployable sensor for the received detection signal.

The voice-message status report further includes information regarding a status of a communication link between the deployable gateway surveillance node and the remote monitoring station, a received detection signal strength and/or detected activity information. The method may also include establishing a positioning information communication link from the deployable gateway surveillance node to a positioning/navigation system (e.g. GPS). As such, the voice-message status report may include information regarding a status of the positioning information communication link between the deployable gateway surveillance node and the positioning/navigation system.

Determining and transmitting the voice-message status report may comprise transmitting the voice-message status report to the at least one mobile radio during a system deployment mode for a predetermined time period. Wirelessly transmitting the detection signal may include generating the detection signal in response to the detected activity with a passive infrared (PIR) detector, a seismic detector, a magnetic detector and/or an acoustic detector, for example. Also, a plurality of deployable sensors may be positioned for unattended surveillance. And the method may include positioning at least one deployable relay node to relay detection signals to the deployable gateway surveillance node.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
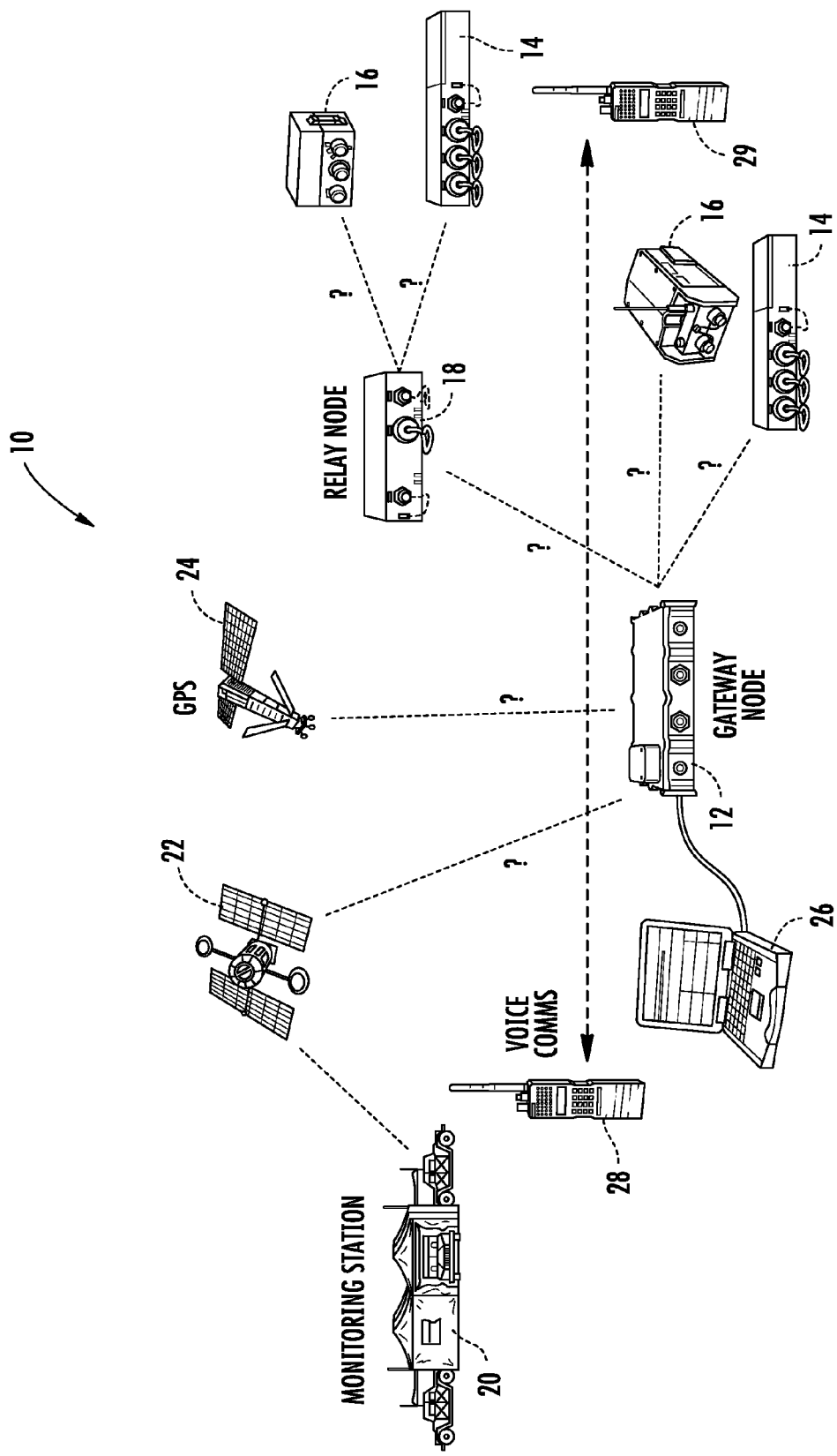
FIG. 1 is a schematic diagram illustrating a surveillance system in accordance with the prior art.

Referring initially to FIG. 1, a conventional surveillance system 10 and associated method of deployment will be described. The system 10 includes a gateway surveillance node 12, various unattended sensors 14, 16, relay nodes 18 and a monitoring station 20. The gateway node 12 may establish a communication link with the monitoring station 20 via a communication satellite 22, and may also establish a communication link with a global positioning system (GPS) satellite 24, as would be appreciated by those skilled in the art.

The sensors 14, 16 communicate detection signals to the gateway node 12 directly or via the relay node 18. When positioning the sensors 14, 16 it may be desirable to verify operation of the system 10 including the various communication links. So the persons involved in deploying the system 10 may typically use an interface 26, e.g. a laptop or other specialized device (e.g. a PDA) running a system management application, associated with the gateway node 12, and respective handheld radios 28, 29. The operator of the interface 26 may communicate, via the radio 28, the various information gathered by the interface regarding the status of the various sensors 14, 16 being deployed. The operator in the field may adjust the positioning of the sensors 14, 16 based upon the information received via radio 29. The operator at gateway node 12 may verify the communication between gateway node 12 and the GPS satellite 24 and communication satellite 22 using interface 26.

As discussed above, in such a conventional approach, the use of the interface 26 may result in added weight and bulk of the equipment needed for system deployment. Furthermore, covertness may be compromised (e.g. via the display illumination and by the activities of additional personnel) and the system may be impractical for one person to deploy. Such displays can also be difficult to see in bright sunlight.

Figure 2:
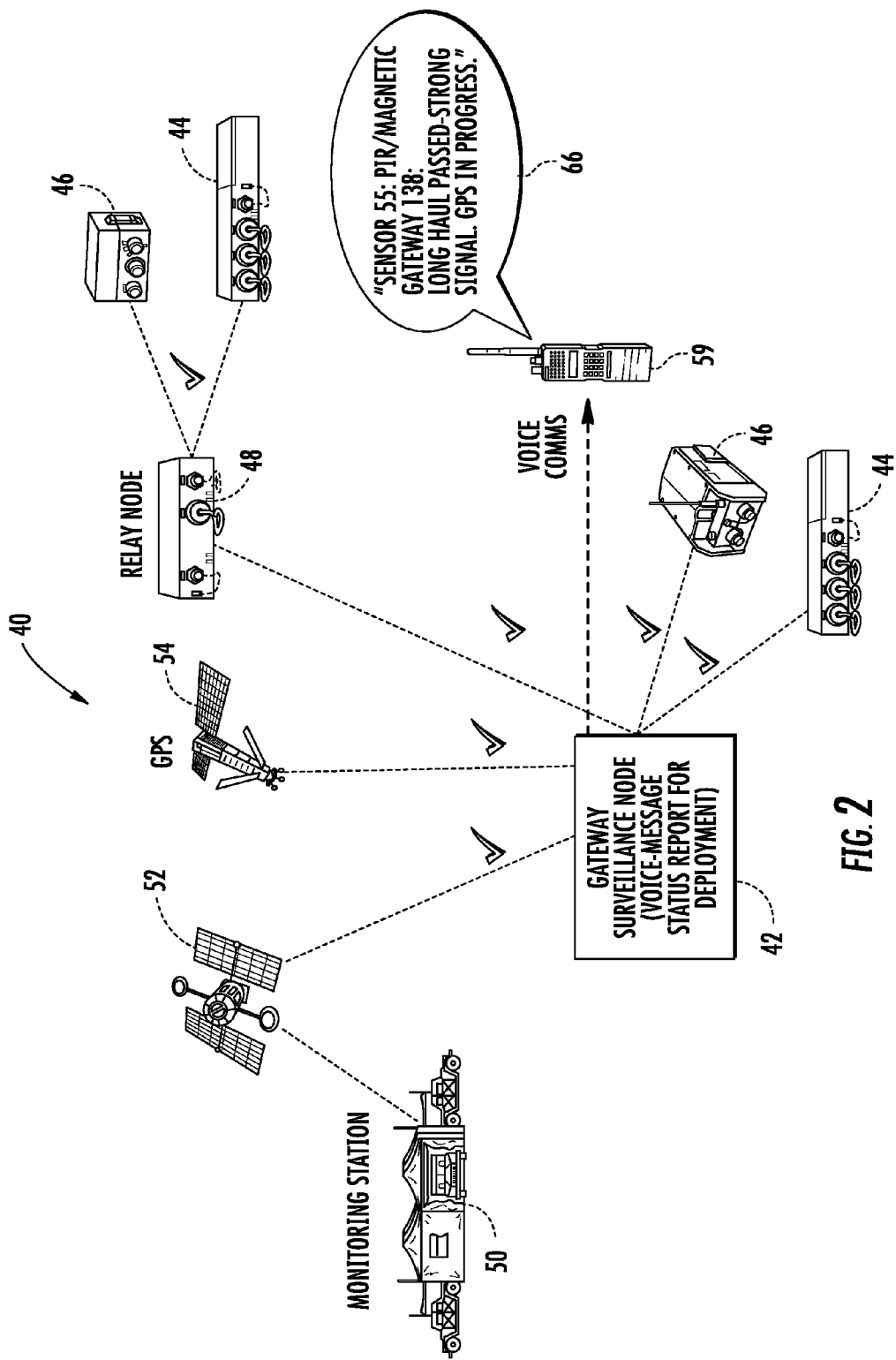
FIG. 2 is a schematic diagram illustrating a surveillance system in accordance with an embodiment of the present invention.
Figure 3:
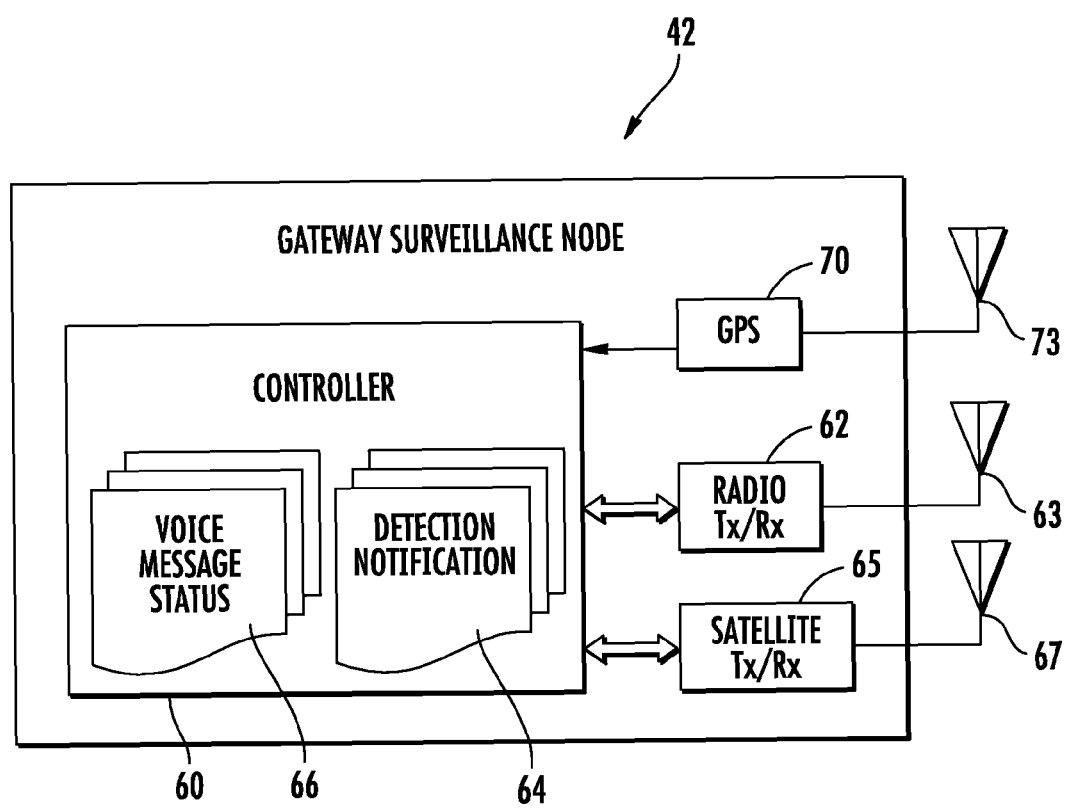
FIG. 3 is a schematic block diagram illustrating details of an embodiment of the deployable gateway surveillance node in the system of FIG. 2.

Referring now to FIGS. 2 and 3, a surveillance system, devices and associated methods in accordance with an embodiment of the invention will now be described. The present approach may reduce the deployment labor needed and increase covertness with the use of a voice-message status report during system deployment.

The surveillance system 40 may include a remote monitoring station 50, at least one mobile radio 59 (e.g. a handheld radio or manpack radio), and one or more deployable sensors 44, 46 each for surveillance (e.g. unattended surveillance) and to transmit (e.g. wirelessly) a detection signal in response to a detected activity. The remote monitoring station 50 may be an operations command center, for example, having various computer and communications networks and equipment as would be appreciated by those skilled in the art.

A sensor 44, 46 may include one or more detectors such as a magnetic detector, a passive infrared detector (PIR), a seismic detector, an acoustic detector or a digital imager, for example. A magnetic detector detects magnetic field changes, a PIR detector detects incident thermal changes caused by a person or vehicle, and a seismic detector detects vibrations. Other types of detectors may be used. The sensor 44, 46 can be configured with different types of detectors depending on the surveillance requirements. Upon deployment of the sensor 44, 46, the various detectors may be activated. An associated wireless transmitter or transceiver may be included in the sensor 44, 46. A relay node 48 may be provided to relay detection signals to the deployable gateway surveillance node 42. Furthermore, a sensor 44, 46 may also be integrated with the gateway node 42.

The deployable gateway surveillance node 42 includes a controller 60 and at least one wireless transceiver 62 cooperating therewith to transmit a notification 64 to the remote monitoring station 50 based upon a received detection signal from a sensor 44, 46 in a line-of-sight operation. Alternatively, the deployable gateway surveillance node 42 may communicate with the remote monitoring station 50 utilizing transceiver 65 via antenna 67 and communications satellite 52.

The controller 60 and wireless line-of-sight transceiver 62 cooperate to determine and transmit a voice-message status report 66, based upon the received detection signal, to the at least one mobile radio 59. Such a voice-message status report 66 at least includes information identifying the deployable gateway surveillance node 42 and corresponding deployable sensor 44, 46 for the received detection signal. The voice-message status report 66 may further include information regarding a status of a communication link between the deployable gateway surveillance node 42 and the remote monitoring station 50, a received detection signal strength and/or detected activity information.

For example, as illustrated in FIG. 2, the voice-message status report 66 is transmitted to the handheld radio 59 and identifies a particular sensor and provides information regarding the type of detection, e.g. "PIR/Magnetic." The particular gateway node is also identified and information regarding the health and/or status thereof is included. It is emphasized that no special equipment is needed for deployment as the handheld radio 59, for example, may be typically already carried by the operator in the field.

The controller 60 and receiver 70 in the deployable gateway surveillance node 42 may also cooperate to establish a positioning information communication link, via antenna 73, with a positioning/navigation system, such as a GPS satellite 54. As such, the voice-message status report 66 may include information regarding a status of the positioning information communication link between the deployable gateway surveillance node 42 and the positioning/navigation system.

The controller 60 and the wireless transceiver 62 of the deployable gateway surveillance node 42 may transmit the voice-message status report 66 to the mobile radio 59 via antenna 63 during a system deployment mode. Also, The voice-message status may be transmitted for a predetermined time period after the deployable gateway surveillance node 42 receives the detection signal, i.e. from a deployed sensor 44, 46, during the system deployment mode that is in effect for a predetermined time period, e.g. 30 minutes. For example, a user, carrying the handheld radio 59, may deploy the deployable gateway surveillance node 42 and subsequently begin positioning the deployable sensors 44, 46 and relay nodes 48 if needed. After positioning a particular sensor 44, 48, the user may trip one or more detectors therein which leads to the transmission of a detection signal to deployable gateway surveillance node 42.

After receiving the detection signal, the deployable gateway surveillance node 42 determines and transmits a voice-message status report 66 to the user via the handheld radio 59, e.g. using an FM voice communications channel. Based upon the information included in the voice-message status report 66, the user may verify the readiness of the sensor 44, 46 and/or deployable gateway surveillance node 42, or the use may adjust the positioning of the system components to achieve more desirable results. Thus, a single user may deploy the deployable gateway surveillance node 42 and related sensors 44, 46 and relay nodes 48 with the aid of the voice-message status report 66. No added equipment is needed other than the handheld radio 59 that may be typically already carried by the operator in the field.

A method aspect is directed to deploying a surveillance system 40 including the remote monitoring station 50, at least one mobile radio 59, at least one deployable sensor 44, 46 and a deployable gateway surveillance node 42 having a controller 60 and at least one wireless transceiver 62 cooperating therewith. The method includes positioning the deployable gateway surveillance node 42, and positioning the at least one deployable sensor 44, 46 for unattended surveillance to wirelessly transmit a detection signal in response to a detected activity.

The method further includes transmitting a notification 64 from the deployable gateway surveillance node 42 to the remote monitoring station 50, e.g. via communications satellite 52, based upon a received detection signal. A voice-message status report 66 is determined and transmitted, based upon the received detection signal, from the deployable gateway surveillance node 42 to the mobile radio 59 identifying the deployable gateway surveillance node and corresponding deployable sensor 44, 46 for the received detection signal.

Again, the voice-message status report 66 may include information regarding a status of a communication link between the deployable gateway surveillance node 42 and the remote monitoring station 50, a received detection signal strength and/or detected activity information. The method may also include establishing a positioning information communication link from the deployable gateway surveillance node 42 to a positioning/navigation system 54 (e.g. GPS). As such, the voice-message status report 66 may include information regarding a status of the positioning information communication link between the deployable gateway surveillance node 42 and the positioning/navigation system 54.

Determining and transmitting the voice-message status report 66 may comprise transmitting the voice-message status report to the mobile radio 59 during a system deployment mode and for a predetermined time period, as discussed above. Wirelessly transmitting the detection signal may include generating the detection signal in response to the detected activity with a passive infrared (PIR) detector, a seismic detector, a magnetic detector and/or an acoustic detector, for example. Also, a plurality of deployable sensors 44, 46 may be positioned for unattended surveillance. And, the method may include positioning at least one deployable relay node 48 to relay detection signals to the deployable gateway surveillance node 42.

Thus, the present approach includes a voice-message transmission capability for use during deployment of the gateway surveillance node 42 and associated sensors 44, 46. Received detection signals during deployment cause the gateway surveillance node 42 to transmit the voice-message reports to communication equipment such as a handheld radio 59. The reports include such information as identification of the corresponding sensor and surveillance gateway, status of the That which is claimed is:

1. A surveillance system comprising:
   a remote monitoring station;
   at least one mobile radio;
   at least one deployable sensor for unattended surveillance to transmit a detection signal in response to a detected activity;
   a deployable gateway surveillance node comprising a controller and at least one transceiver cooperating therewith to
      receive the detection signal,
      transmit a notification to the remote monitoring station based upon the received detection signal, and
      determine and transmit a voice-message status report, based upon the received detection signal, to the at least one mobile radio identifying the deployable gateway surveillance node and corresponding deployable sensor for the received detection signal.

2. The surveillance system of claim 1, wherein the voice-message status report further includes at least one of information regarding a status of a communication link between the deployable gateway surveillance node and the remote monitoring station, a received detection signal strength, and detected activity information.

3. The surveillance system of claim 1, wherein the deployable gateway surveillance node further comprises a positioning/navigation system receiver; and wherein the controller and the positioning/navigation system receiver in the deployable gateway surveillance node cooperate to establish a positioning information communication link with a positioning/navigation system; and wherein the voice-message status report includes information regarding a status of the positioning information communication link between the deployable gateway surveillance node and the positioning/navigation system.

4. The surveillance system of claim 3, wherein the positioning/navigation system comprises a global positioning system (GPS) satellite.

5. The surveillance system of claim 1, wherein the at least one transceiver of the deployable gateway surveillance node transmits the voice-message status report to the at least one mobile radio during a system deployment mode.

6. The surveillance system of claim 5, wherein the at least one transceiver transmits the voice-message status report after the deployable gateway surveillance node receives the detection signal during the system deployment mode which is active for a predetermined time period.

7. The surveillance system of claim 1, wherein the at least one deployable sensor comprises at least one detector and associated wireless transmitter to generate and transmit the detection signal in response to the detected activity.

8. The surveillance system of claim 7, wherein the at least one detector includes at least one of a passive infrared (PIR) detector, a seismic detector, a magnetic detector, and an acoustic detector.

9. The surveillance system of claim 1, wherein the at least one mobile radio comprises at least one handheld radio.

10. The surveillance system of claim 1, further comprising at least one deployable relay node to relay detection signals to the deployable gateway surveillance node.

11. A deployable gateway surveillance node for use in a surveillance system including a remote monitoring station, at least one mobile radio, and at least one deployable sensor for unattended surveillance to transmit a detection signal in response to a detected activity, the deployable gateway surveillance node comprising:
    a controller; and
    at least one wireless transceiver cooperating with the controller to
       receive the detection signal,
       transmit a notification to the remote monitoring station based upon the received detection signal, and
       determine and transmit a voice-message status report, based upon the received detection signal, to the at least one mobile radio identifying the deployable gateway surveillance node and corresponding deployable sensor for the received detection signal.

12. The deployable gateway surveillance node of claim 11, wherein the voice-message status report further includes at least one of information regarding a status of a communication link between the deployable gateway surveillance node and the remote monitoring station, a received detection signal strength, and detected activity information.

13. The deployable gateway surveillance node of claim 11, wherein wherein the deployable gateway surveillance node further comprises a positioning/navigation system receiver; and wherein the controller and the positioning/navigation system receiver cooperate to establish a positioning information communication link with a global positioning system (GPS) satellite; and wherein the voice-message status report includes information regarding a status of the positioning information communication link between the deployable gateway surveillance node and the GPS satellite.

14. The deployable gateway surveillance node of claim 11, wherein the at least one wireless transceiver transmits the voice-message status report to the at least one mobile radio during a system deployment mode.

15. A method of deploying a surveillance system including a remote monitoring station, at least one mobile radio, at least one deployable sensor, and a deployable gateway surveillance node having a controller and at least one wireless transceiver cooperating therewith, the method comprising:
    positioning, the deployable gateway surveillance node;
    positioning the at least one deployable sensor for unattended surveillance to transmit a detection signal in response to a detected activity;
    transmitting a notification from the deployable gateway surveillance node to the remote monitoring station based upon a received detection signal; and
    determining and transmitting a voice-message status report, based upon the received detection signal, from the deployable gateway surveillance node to the at least one mobile radio identifying the deployable gateway surveillance node and corresponding deployable sensor for the received detection signal.

16. The method of claim 15, wherein the voice-message status report further includes at least one of information regarding a status of a communication link between the deployable gateway surveillance node and the remote monitoring station, a received detection signal strength, and detected activity information.

17. The method of claim 15, further comprising establishing a positioning information communication link from the deployable gateway surveillance node to a positioning/navigation system; and wherein the voice-message status report includes information regarding a status of the positioning information communication link between the deployable gateway surveillance node and the positioning/navigation system.

18. The method of claim 15, wherein determining and transmitting the voice-message status report comprises transmitting the voice-message status report to the at least one mobile radio during a system deployment mode.

19. The method of claim 18, wherein determining and transmitting the voice-message status report comprises transmitting the voice-message status report to the at least one mobile radio during the system deployment mode which is active for a predetermined time period.

20. The method of claim 15, wherein wirelessly transmitting the detection signal comprises generating the detection signal in response to the detected activity with at least one of a passive infrared (PIR) detector, a seismic detector, a magnetic detector and an acoustic detector.

21. The method of claim 15, further comprising positioning at least one deployable relay node to relay detection signals to the deployable gateway surveillance node.

* * * * *